United States Patent
Shaanan et al.

(10) Patent No.: US 6,332,084 B1
(45) Date of Patent: Dec. 18, 2001

(54) MULTIPLE MODE WIRELESS TELEPHONE

(75) Inventors: Gad Shaanan, Westmount; Francois Duval, Terrebonne; Ivan Brousseau, Montreal, all of (CA)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/415,610

(22) Filed: Oct. 9, 1999

(51) Int. Cl.[7] ....................................................... H04B 1/38
(52) U.S. Cl. ........................ 455/556; 455/90; 348/14.01; 348/552
(58) Field of Search ............................. 455/556, 66, 74, 455/344, 347, 90, 566; 348/14.01, 14.03, 14.07, 552; 379/428.01

(56) References Cited

U.S. PATENT DOCUMENTS 5,414,444   5/1995   Britz ...................................... 345/156
5,584,054  12/1996   Tyneski et al. ........................ 455/89

FOREIGN PATENT DOCUMENTS 0534478   3/1993   (EP) .
0804009  10/1997   (EP) ............................... H04M/1/72

Primary Examiner—Lee Nguyen
(74) Attorney, Agent, or Firm—Philip R. Wadsworth; Chalrles D. Brown; Howard H. Seo

(57) ABSTRACT

A wireless telephone (100) has a video monitor (106) which is thin enough for a touch-screen (112) to slide partially beneath it, with enough room for a touch-screen-cover (110) to slide between them. The touch-screen-cover, when not slid between the touch-screen and the monitor, covers the part of the touch-screen which the monitor does not cover. When the touch-screen-cover is slid between the touch-screen and the monitor, it exposes the parts of the touch-screen which are not covered by the monitor, and it allows the touch-screen to be slid completely out from underneath the monitor, thereby exposing all of the touch-screen. Thus, the touch-screen may be completely covered, partially covered, or completely uncovered. Each covering configuration is suited for a different set of wireless telephone capabilities.

22 Claims, 3 Drawing Sheets

MULTIPLE MODE WIRELESS TELEPHONE

BACKGROUND OF THE INVENTION

This invention relates to wireless telephones, and has particular relation to wireless telephones which may be used in multiple modes, such as audio, video, Internet, and the like.

It is expected of a wireless telephone only that it will have a keypad, a microphone, and an earpiece or other speaker. In this respect, it is like a wireline telephone. If video or Internet capabilities are to be added on to a wireline telephone, the add-on nature of these capabilities is apparent. No one expects a conventional wireline telephone to have video or Internet capabilities. These capabilities are instead provided by a personal computer (PC). The only significant connection between the PC and the telephone is that they share the same telephone line.

Miniaturization has proceeded more quickly in wireless telephones than in wireline telephones because light weight and low power consumption are so much more important. It has thus become possible, at least in semi-portable telephones, for a wireless telephone to have video and Internet capabilities. What has not yet been possible is for these capabilities to be designed in a user-friendly configuration.

SUMMARY OF THE INVENTION

This invention overcomes these difficulties by providing a video monitor which is thin enough for a touch-screen to slide partially beneath it, with enough room for a touch-screen-cover to slide between them. The touch-screen-cover, when not slid between the touch-screen and the monitor, covers the part of the touch-screen which the monitor does not cover. When the touch-screen-cover is slid between the touch-screen and the monitor, it does two things. First, it exposes the parts of the touch-screen which are not covered by the monitor. Second, it allows the touch-screen to be slid completely out from underneath the monitor, thereby exposing all of the touch-screen. Thus, the touch-screen may be completely covered, partially covered, or completely uncovered. Each covering configuration is suited for a different set of wireless telephone capabilities.

BRIEF DESCRIPTION OF THE DRAWINGS

Figure 1:
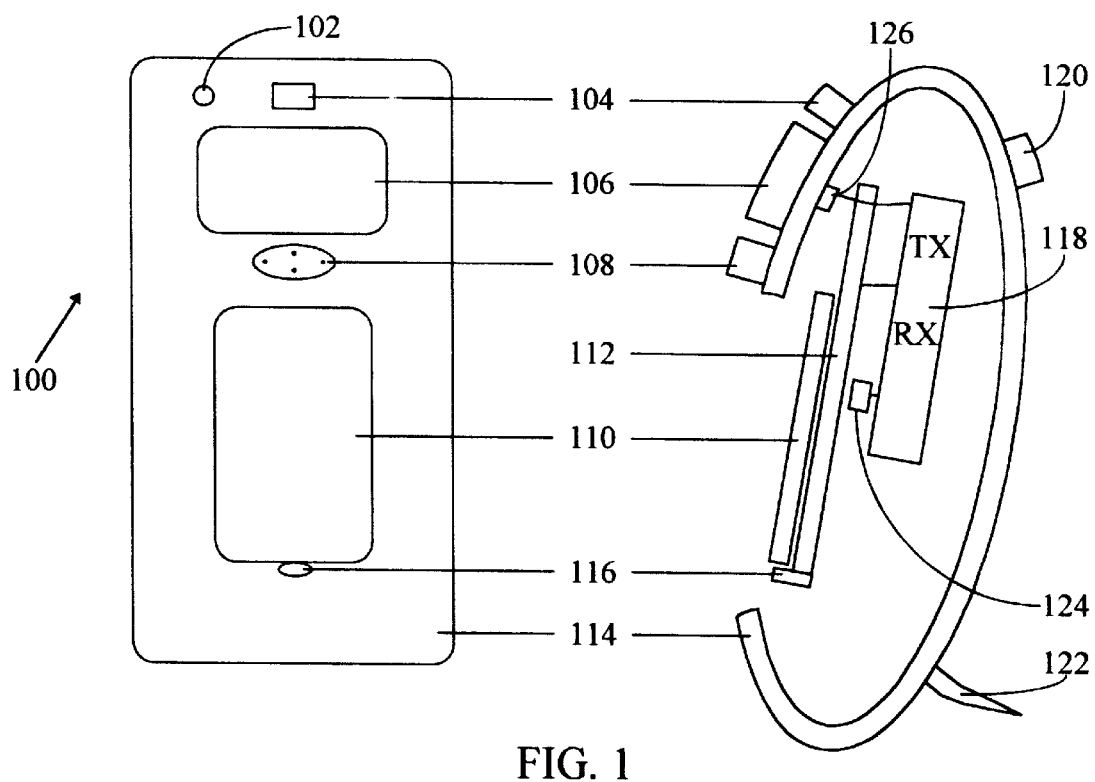
FIG. 1 shows the exterior of a wireless telephone, in front plan view (left) and side section view (right).

FIG. 1 shows the exterior of a wireless telephone (100), in front plan view (left) and side section view (right), when configured for audio or video use. It includes a video camera (102), earpiece (104), video monitor (106), navigation key (108), touch-screen-cover (110), touch-screen (112), housing (114), and microphone (116). Actual processing of the telephone call is done by a transceiver (118), which is connected to the other elements mentioned above. A speaker (120) may be provided on the back of the telephone (100) if hands-free capabilities are desired. In this case, a retractable stand (122) allows the telephone (100) to be placed upright on a desktop or other horizontal surface. This is particularly desirable in video mode, since a hand-held telephone produces an unsteady image. If not, the earpiece (104) acts as a speaker.

The navigation key (108) is preferably an up-down-left-right key, to navigate around the monitor (106) and the touch-screen (112). It lies substantially coplanar with the face of the monitor (106), so that it may be operated regardless of whether the touch-screen (112) is closed or open.

A touch-screen position detector (124) detects the position of the touch-screen (112), and a touch-screen-cover position detector (1 26) detects the position of the touch-screen cover (110).

The touch-screen-cover (110) may be slid upward between the monitor (106) and the touch-screen (112), thereby exposing the lower portion of the touch-screen (112). As shown in FIG. 1, it lies between, and substantially parallel to, the face of the monitor (106) and the face of the touch-screen (112). The touch-screen (112) may be programmed to display a soft version of a conventional, hard key, keypad. The touch-screen-cover (110) slides between a closed position (see FIG. 1), in which it covers the face of the touch-screen (112), and an open position (see FIG. 2) in which it exposes the face of the touch-screen (112) and lies substantially behind the face of the monitor (106).

The telephone (100) is programmed such that, when the soft keys on the keypad are touched, it places a call just as if it were responding to a conventional, hard key, keypad. The soft keys may be used to select whether the call is to be placed in audio mode or video mode. The monitor (106) may display the partially keyed in number (to assure that the number is being correctly keyed in) or not (for privacy).

Alternatively, the touch-screen-cover (110) may remain in its closed position. In this case, operation of the navigation key (108) may cause a list of memorized telephone numbers to appear on the monitor. The navigation key (108) typically has four positions: up, down, left, and right. Up and down are used to scroll through the list, left is used to call the number which the scroll currently displays, and right is used to cancel the previous action (or hang up the phone). The telephone (100) may be programmed such that, upon first actuation of the navigation key (108), a list of memorized numbers immediately appears, to be called in audio mode. Alternatively, it may be programmed to display a menu of actions, such as place call in video mode, turn on data access but not the transmitter (useful in airplanes or other situations in which transmission must be suppressed), and the like. Keeping the touch-screen-cover (108) in its closed position reduces the possibility of accidentally placing a call.

The telephone (100) may conveniently be constructed such that, if it is off, it turns on in response to receiving an open-position signal from the touch-screen-cover position detector (124). It may likewise conveniently be constructed such that, if it is engaged in a call, it hangs up in response to receiving a closed-position signal from the touch-screen-cover position detector (124).

Figure 2:
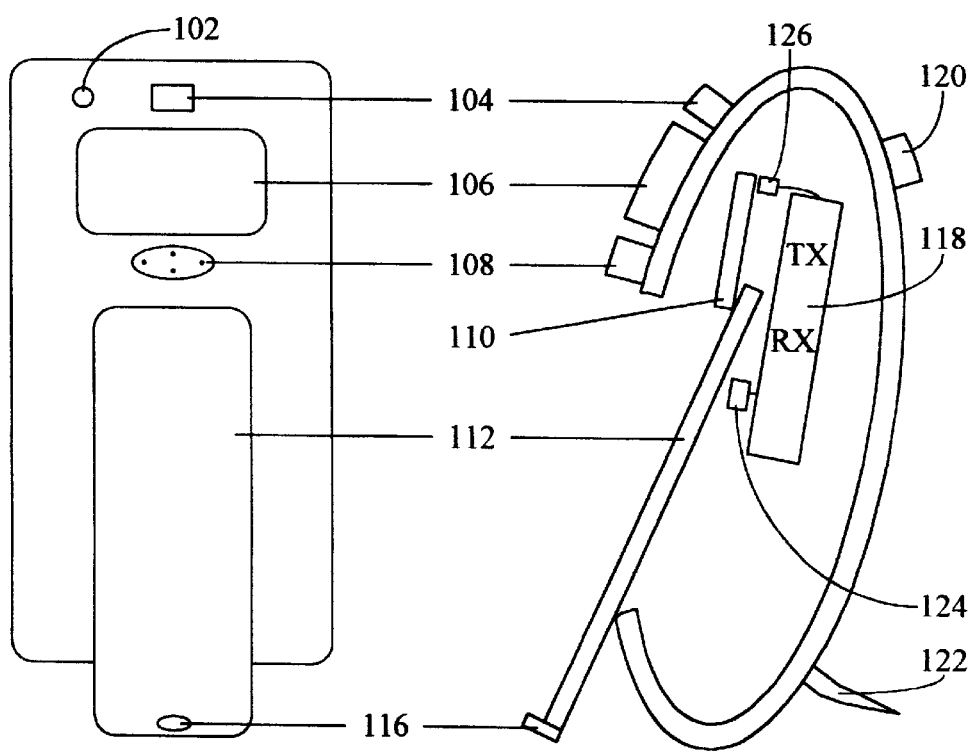
FIG. 2 shows the same phone when configured for data use.

FIG. 2 shows the same phone when configured for data use. The touch-screen-cover (110) has been slid under the monitor (106), and the touch-screen (112) itself has been slid down, out from underneath the monitor (106). Thus, all of the touch-screen (106) is exposed as a user interface. The touch-screen (106) carries the microphone (116), so that Voice-Over-Internet-Protocol (VOIP), or some similar mixed audio-and-data protocol, may be used. The touch-screen (112) lies behind, and substantially parallel to, the face of the monitor (106). In its closed position, its face is partially covered by the monitor (106). In its open position, its face is uncovered by the monitor (106).

The transceiver (118) enters different modes of operation (described below) of the microphone (104), speaker (104), camera (102), monitor (106), and touch screen (112). It is preferred that the camera (102) be present, and that the touch-screen (112) be slidable. However, the present invention also works without either or both of these features.

Figure 3:
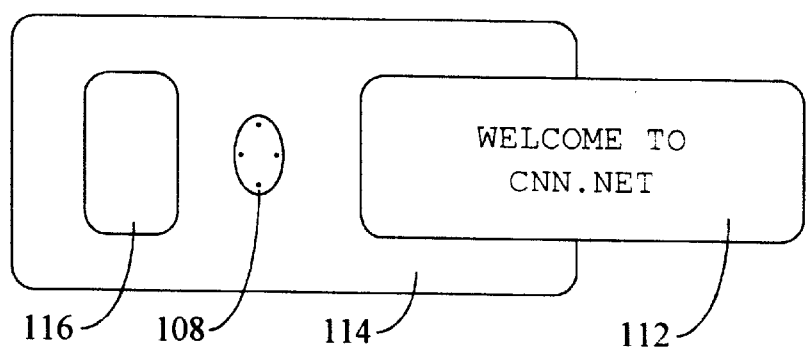
FIG. 3 shows the telephone, configured for data use, in Internet mode.

FIG. 3 shows the telephone (100), configured for data use, in Internet mode. The extended touch-screen (112) shows whatever web page the user has downloaded from a remote server. Alternatively, it shows the web page which the user is preparing to upload. The user may scroll through a menu, preferably with the navigational key (108) to enter Internet mode. Alternatively, the user may configure the telephone (100) such that the act of extending the touch-screen (112) causes the touch-screen position detector (124) to send a signal to a transceiver (120) causes the telephone to enter Internet mode.

Figure 4:
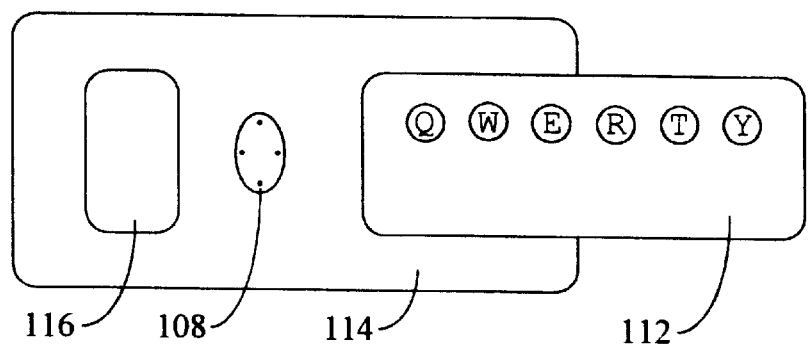
FIG. 4 shows the telephone in keyboard mode.

FIG. 4 shows the telephone (100) in keyboard mode. The touch-screen (112), instead of displaying soft keys for entry of a telephone number, displays soft keys for a conventional typewriter keyboard. This allows alphanumeric data to be entered more quickly than by attempting to adapt a numeric telephone keypad to the entry of alpha data.

Keyboard mode may be combined with Internet mode to form e-mail mode. In this mode, characters are entered on the touch-screen (112) and are shown, ready for transmission, on the monitor (106). As shown in FIG. 4, this is particularly convenient for right-handed users. The left hand holds the housing (114), and the right hand touches the touch-screen (112).

Figure 5:
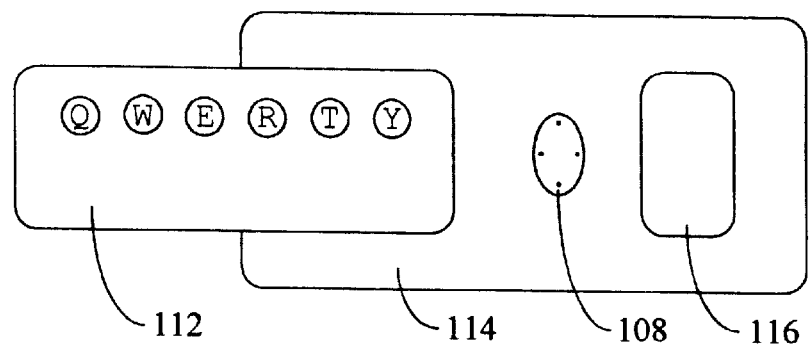
FIG. 5 shows how the apparatus of FIG. 4 may be adapted for left-handed users.

FIG. 5 shows how the apparatus of FIG. 4 may be adapted for left-handed users. Software in the transceiver (118) inverts the right-handed image. In a right-handed image, the right side of the touch-screen (112), as seen in FIG. 1, becomes the top of the page. In a left-handed image, it is the left side of the touch-screen (112) which becomes the top of the page. This inversion may take place whenever a left-handed user has requested it, and is not limited to keyboard mode.

Figure 6:
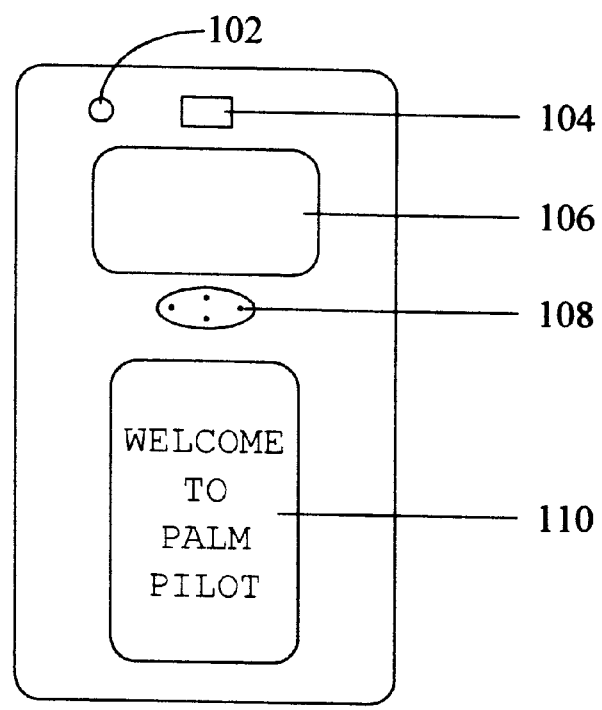
FIG. 6 shows the telephone in Personal Digital Assistant (PDA) mode.

FIG. 6 shows the telephone (100) in Personal Digital Assistant (PDA) mode. Software in the transceiver (118) configures the touch-screen (112) to emulate any desired PDA, or to create a new one. Depending on the PDA desired, the touch-screen (112) may be in either the closed or open position. FIG. 6 shows the closed position.

Figure 7:
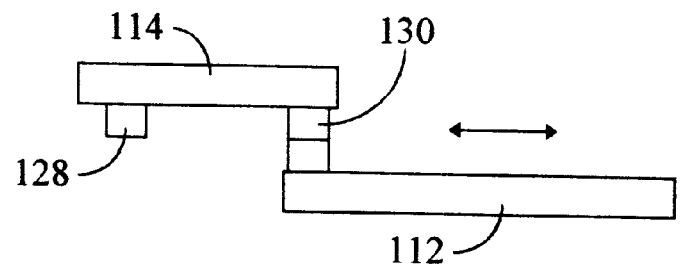
FIG. 7 shows a preferred construction of the touch-screen position detector.

FIG. 7 shows a preferred construction of the touch-screen position detector (124): a first set of contacts (128) when the touch-screen (112) is in the closed position, and a second set of contacts (130) when the touch-screen (112) is in the open position. FIG. 7 shows the contacts as being only on a printed circuit board carried on the housing (114), but they could also be on the touch-screen (112), or on both. The touch-screen-cover position detector (126) preferably has a similar construction.

A CD-ROM accompanies this application, is incorporated herein by reference, and shows the present invention in operation.

INDUSTRIAL APPLICABILITY

This invention is capable of exploitation in industry, and can be made and used, whenever is it desired to operate a wireless telephone in multiple modes. The individual components of the apparatus and method shown herein, taken separate and apart from one another, may be entirely conventional, it being their combination which is claimed as the invention.

While various preferred embodiments and modes of apparatus and method have been described, the true spirit and scope of the invention are not limited thereto, but are limited only by the following claims and their equivalents, and such is claimed as the invention.

What is claimed is:

1. A wireless telephone (100) which:
   a) includes:
      i) a transceiver (118);
      ii) a microphone (116), a monitor (106), and a speaker (104), all connected to the transceiver (118); and
      iii) a navigation key (108) which:
         (1) is connected to the transceiver (118); and
         (2) lies substantially coplanar with a face of the monitor (106); and
   b) is characterized in that:
      i) the wireless telephone (100) further includes:
         (1) a touch-screen (112) which is connected to the transceiver (118);
         (2) a touch-screen-cover (110) which:
            (a) lies between, and substantially parallel to, a face of the monitor (106) and a face of the touch screen; and
            (b) is constructed to slide between:
               (i) a closed position, in which it covers the face of the touch-screen; and
               (ii) an open position, in which it exposes the face of the touch-screen (112) and lies substantially behind the face of the monitor (106); and
         (3) a touch-screen-cover (110) position detector (126) connected to the transceiver (118); and
      ii) the wireless telephone (100) is constructed such that the transceiver (118) enters different modes of operation of the microphone (116), monitor (106), speaker (104), and touch-screen (112) in response to signals from:
         (1) the touch-screen;
         (2) the touch-screen-cover (110) position detector (126); and
         (3) the navigation key (108).

2. The wireless telephone (100) of claim 1, further characterized in that:
   a) the touch-screen:
      i) has a face which lies behind, and substantially parallel to, a face of the monitor (106); and
      ii) is constructed to slide between:
         (1) a closed position, in which its face is partially covered by the monitor (106); and
         (2) an open position, in which its face is uncovered by the monitor (106);
   b) the telephone (100) further includes a touch-screen (112) position detector connected to the transceiver (118); and
   c) the wireless telephone (100) is constructed such that the transceiver (118) enters different modes of operation of the microphone (116), monitor (106), speaker (104), and touch-screen (112) in response to signals from the touch-screen (112) position detector as well as of the touch-screen, the touch-screen-cover (110) position detector (126), and the navigation key (108).

3. The wireless telephone (100) of claim 1, further characterized in that:
   a) the wireless telephone (100) further includes a camera (102) attached to the transceiver (118); and
   b) the wireless telephone (100) is constructed such that the transceiver (118) enters different modes of operation of the camera (102) as well as of the microphone (116), monitor (106), speaker (104), and touch-screen in response to signals from the touch-screen (112) position detector.

4. The wireless telephone (100) of claim 1, further characterized in that, when the touch-screen (112) position detector sends an open-position signal to the transceiver (118), the wireless telephone (100) enters Internet mode.

5. The wireless telephone (100) of claim 1, further characterized in that it is constructed such that, when the touch-screen (112) position detector sends an open-position signal to the transceiver (118), the wireless telephone (100) enters keyboard mode.

6. The wireless telephone (100) of claim 1, further characterized in that it is constructed such that, when the touch-screen (112) position detector sends an open-position signal to the transceiver (118), the wireless telephone (100) enters Personal Digital Assistant mode.

7. The wireless telephone (100) of claim 1, further characterized in that it is constructed such that, when the touch-screen (112) position detector sends an open-position signal to the transceiver (118), the touch-screen (112) enters either a left-side-becomes-top mode or a right-side-becomes-top mode, as configured by a user of the wireless telephone (100).

8. The wireless telephone (100) of claim 1, further characterized in that the wireless telephone (100) is constructed such that, if it is off, it turns on in response to receiving an open-position signal from the touch-screen-cover (110) position detector (126).

9. The wireless telephone (100) of claim 1, further characterized in that it is constructed such that, if it is engaged in a call, it hangs up in response to receiving a closed-position signal from the touch-screen-cover (110) position detector (126).

10. The wireless telephone (100) of claim 1, further characterized in that the touch-screen-cover (110) position detector (126) includes:
    a) a first set of contacts when the touch-screen-cover (110) is in the closed position; and
    b) a second set of contacts when the touch-screen-cover (110) is in the open position.

11. The wireless telephone (100) of claim 1, further characterized in that the touch-screen (112) position detector includes:
    a) a first set of contacts (128) when the touch-screen (112) is in the closed position; and
    b) a second set of contacts (130) when the touch-screen (112) is in the open position.

12. A method for using a wireless telephone (100), wherein the wireless telephone (100) includes:
    a) a transceiver (118);
    b) a microphone (116), a monitor (106), and a speaker (104), all connected to the transceiver (118); and
    c) a navigation key (108) which:
       i) is connected to the transceiver (118); and
       ii) lies substantially coplanar with a face of the monitor (106);

and wherein the method is characterized in that the method includes:
   d) sliding a touch-screen-cover (110), which lies between and substantially parallel to a face of the monitor (106) and a face of a touch screen, between
      i) a closed position, in which it covers the face of the touch-screen; and
      ii) an open position, in which it exposes the face of the touch-screen (112) and lies substantially behind the face of the monitor (106);
   e) detecting:
      i) a touch-screen-cover (110) position;
      ii) touches on a touch-screen; and
      iii) depressions of the navigation key (108); and
   f) entering different modes of operation of the microphone (116), monitor (106), speaker (104), and touch-screen (112) in response to such detection.

13. The method of claim 12, further characterized in that:
    a) the touch-screen (112) has a face which lies behind, and substantially parallel to, a face of the monitor (106); and
    b) the method further includes:
       i) sliding the touch-screen (112) between:
          (1) a closed position, in which its face is partially covered by the monitor (106); and
          (2) an open position, in which its face is uncovered by the monitor (106);
       ii) detecting a touch-screen (112) position; and
       iii) entering different modes of operation of the microphone (116), monitor (106), speaker (104), and touch-screen (112) in response to such touch-screen (112) position detection as well as of the touch-screen-cover (110) position detection, the touch-screen (112) touching, and the navigation key (108) depression.

14. The method of claim 12, further characterized in that:
    a) the wireless telephone (100) further includes a camera (102) attached to the transceiver (118); and
    b) the method further includes entering different modes of operation of the camera (102) as well as of the microphone (116), monitor (106), speaker (104), and touch-screen in response to such detection.

15. The method of claim 12, further characterized in that, when the touch-screen (112) position is detected as open, the wireless telephone (100) enters Internet mode.

16. The method of claim 12, further characterized in that, when the touch-screen (112) position is detected as open, the wireless telephone (100) enters keyboard mode.

17. The method of claim 12, further characterized in that, when the touch-screen (112) position is detected as open, the wireless telephone (100) enters Personal Digital Assistant mode.

18. The method of claim 12, further characterized in that, when the touch-screen (112) position detector sends an open-position signal to the transceiver (118), the touch-screen (112) enters either a left-side-becomes-top mode or a right-side-becomes-top mode, as configured by a user of the wireless telephone (100).

19. The method of claim 12, further characterized in that, if the wireless telephone (100) is off, it turns on in response to detecting that the touch-screen-cover (110) is open.

20. The method of claim 12, further characterized in that, if the wireless telephone (100) is engaged in a call, it hangs up in response to detecting that the touch-screen-cover (110) is closed.

21. The method of claim 12, further characterized in that the touch-screen-cover (110) position detection includes:

a) contacting a first set of contacts when the touch-screen-cover (110) is in the closed position; and b) contacting a second set of contacts when the touch-screen-cover (110) is in the open position.

22. The method of claim 12, further characterized in that the touch-screen (112) position detection includes:

a) contacting a first set of contacts (128) when the touch-screen (112) is in the closed position; and b) contacting a second set of contacts (130) when the touch-screen (112) is in the open position.

\* \* \* \* \*